United States Patent [19]

Kawahara et al.

[11] Patent Number: 4,809,587
[45] Date of Patent: Mar. 7, 1989

[54] ACTUATOR WITH BUILT-IN PILOT VALVE

[75] Inventors: Eiichiro Kawahara; Kenichi Ikejiri; Takashi Iino, all of Saitama; Kenjiro Iwasawa, Tochigi; Noboru Yamamoto, Saitama, all of Japan

[73] Assignee: Honda Giken Kogyo Kabushiki Kaisha, Tokyo, Japan

[21] Appl. No.: 156,836

[22] Filed: Feb. 17, 1988

[30] Foreign Application Priority Data

Feb. 24, 1987 [JP] Japan .................................. 62-40793

[51] Int. Cl.$^4$ ............................................... F01B 1/00
[52] U.S. Cl. ........................................ 91/166; 91/420; 91/422; 91/433; 91/465
[58] Field of Search ................. 91/420, 461, 422, 465, 91/466, 166, 165, 222, 265, 323, 433, 447

[56] References Cited

U.S. PATENT DOCUMENTS 2,619,038 11/1952 Davidson ........................... 91/222 X
2,755,777 7/1956 Gerwig et al. ..................... 91/422 X
2,969,044 1/1961 Leduc .................................... 91/422
3,302,922 2/1967 Gregor et al. ...................... 91/420 X Primary Examiner—Edward K. Look
Attorney, Agent, or Firm—Lyon & Lyon

[57] ABSTRACT

An actuator has a pilot valve incorporated in a piston thereof which is slidably disposed in a cylinder tube, the piston having first and second piston lands slidably disposed in first and second coaxial cylinder chambers. A spool valve body has first and second spool lands slidably disposed in an inner hole in the piston. When the spool valve body is moved in one direction, a first axial passage in the piston communicates with a pressure sink through a first return port which is opened by the first spool land, and a second axial passage in the piston communicates with a portion of the inner hole in front of the second spool land through a second supply port which is opened by the second spool land. When the spool valve body is moved in the opposite direction, the second axial passage communicates with the pressure sink through a second return passage which is opened by the second spool land, and the first axial passage communicates with a portion of the inner hole in front of the first spool land through a first supply port which is opened by the first spool land. The spool valve body is movable under a differential pressure between two inlet ports. The pilot valve cam amplify the operating force on the piston even if the difference between applied input oil pressure is small. In addition, the actuator is compact in size.

3 Claims, 3 Drawing Sheets

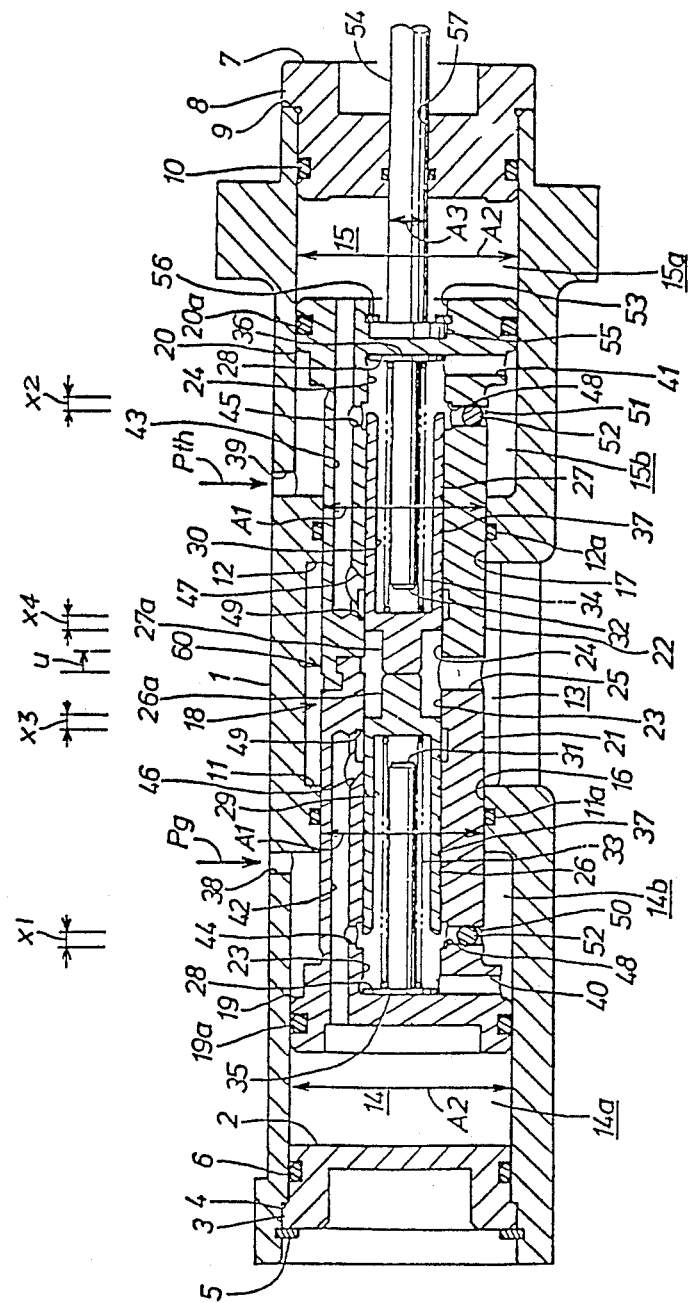

ACTUATOR WITH BUILT-IN PILOT VALVE

BACKGROUND OF THE INVENTION

The present invention relates to an actuator of a compact size with a built-in pilot valve for producing a relatively large operating force in a small range of working oil differential pressures.

Hydraulically operated acuators include double-acting cylinders for producing operating forces in opposite directions dependent on the difference between pressures acting on both ends of the piston. In such actuators, since mechanical frictional forces act on the cylinder itself and an external actuator mechanism, the operating force produced by the piston will be quite small when the differential pressure is relatively low, so that the actuator may operate slowly or fail to operate.

One solution would be to employ a servovalve for enabling the piston to generate a large operating force even in a small range of working oil differential pressures. However, the size of the actuator would be increased since the servovalve would be attached outside of the cylinder. If a pilot valve were used instead, a large operating force would be produced with a small differential pressure, but the actuator would be of a large size as the pilot valve would also be installed outside of the cylinder. Another problem would be that operation of the acutator might become unstable in some cases since a large operating force would be produced with a small differential pressure.

SUMMARY OF THE INVENTION

In view of the aforesaid problems of the conventional actuators, it is an object of the present invention to provide an actuator with a built-in pilot valve, which actuator is compact in size and capable of generating a large operating force in a relatively small range of differential pressures.

Another object of the present invention is to provide an actuator with a built-in pilot valve, which actuator can operate stably and is capable of generating a large operating force in a relatively small range of differential pressures.

The above objects can be achieved in accordance with the present invention by an actuator with a built-in pilot valve, comprising a cylinder tube having first and second cylinder chambers coaxially defined therein, a piston having first and second piston lands slidably and fluid-tightly disposed respectively in the first and second cylinder chambers, and having a piston rod as an operating end, the piston having an axial inner hole defined therein and having closed opposite ends, a spool valve body axially movably and fluid-tightly disposed in the inner hole and having first and second spool lands, first and second axial passages defined in the piston and extending axially inwardly from front surfaces of the piston lands, respectively, the first and second axial passages being held out of communication with each other, a first inlet port for communicating a portion of the first cylinder chamber behind the first piston land with a first external pressure source, a second inlet port for communicating a portion of the second cylinder chamber behind the second piston land with a second external pressure source, a first communication port communicating the portion of the first cylinder chamber behind the first piston land with with a portion of the inner hole in front of the first spool land, a second communication port communicating the portion of the second cylinder chamber behind the second piston land with a portion of the inner hole in front of the second spool land, a first return port for communicating the first axial passage with a pressure sink by being opened by the first spool land when the spool valve body is moved in a first direction, a second supply port for communicating the second axial passage with the portion of the inner hole in front of the second spool land by being opened by the second spool land when the spool valve body is moved in the first direction, a second return port for communicating the second axial passage with the pressure sink by being opened by the second spool land when the spool valve body is moved in a second direction, and a first supply port for communicating the first axial passage with the portion of the inner hole in front of the first spool land by being opened by the first spool land when the spool valve body is moved in the second direction, the spool valve being movable dependent on the magnitude relationship between a pressure acting from the first external pressure source in front of the first spool land through the first inlet port and the first communication port and a pressure acting from the second external pressure source in front of the second spool land through the second inlet port and the second communication port.

With a pilot valve incorporated in the piston of the actuator, the operating force on the piston can be amplified. Therefore, even if the difference between applied working oil pressures is small, a large operating force an be generated. In addition, the actuator is compact in size.

At least one of the communication ports may have a restriction, or the first and second spool lands may uncover the respective first and second supply ports, for stabler actuator operation.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a longitudinal cross-sectional view of an actuator with a built-in pilot valve according to a third embodiment of the present invention.

DESCRIPTION OF THE PREFERRED EMBODIMENTS

Figure 1:
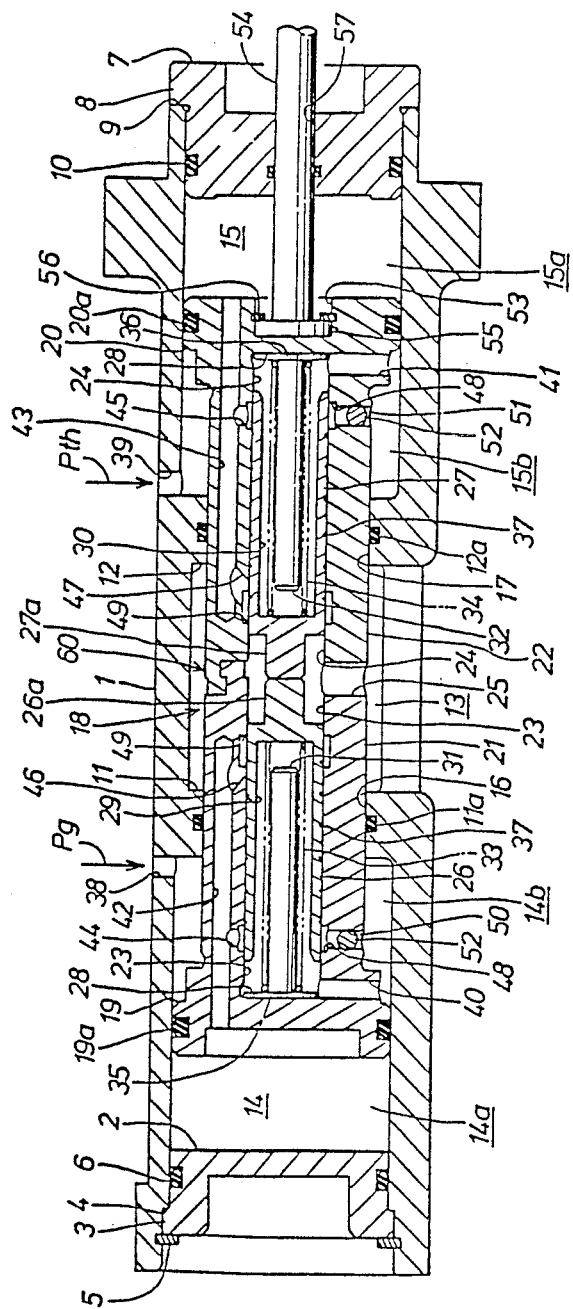
FIG. 1 is a longitudinal cross-sectional view of an actuator with a built-in pilot valve according to a first embodiment of the present invention.

Like or corresponding parts are denoted by like or corresponding reference numerals throughout the views.

FIG. 1 shows in axial cross section an actuator with a built-in pilot valve according to an embodiment of the present invention. The actuator may be used as an actuator for controlling a continuously variable transmission, for example, for use with a motor vehicle such as an automobile.

As shown in FIG. 1, a cylinder tube 1 of a cylindrical shape has open opposite ends. A cover 2 is fixedly fitted in the lefthand (FIG. 1) open end of the cylinder tube 1 to close the lefthand open end. An O-ring 6 is interposed between the inner peripheral surface of the lefthand open end of the cylinder tube 1 and the cover 2 to provide a fluid-tight seal therebetween. The cover 2 has an annular step 3 on its outer peripheral surface, the annular step 3 being held against a corresponding step 4 on the inner peripheral surface of the cylinder tube 1. The cover 2 is retained in place by a C-ring 5. Likewise, a flanged cover 7 is fixedly fitted in the righthand (FIG. 1) open end of the cylinder tube 1 to close the righthand open end. An O-ring 10 is interposed between the inner peripheral surface of the righthand open end of the cylinder tube 1 and the cover 7 to provide a fluid-tight seal therebetween. The flanged cover 7 has a flange 8 retained in place by being sandwiched between an end 9 of the cylinder tube 1 and a bracket (not shown) to which the cylinder tube 1 is fixed.

A pair of partitions 11, 12 are disposed centrally in the cylinder tube 1 in axially spaced, confronting relation to each other. The cylinder tube 1 has a downward opening between the partitions 11, 12. Thus, the interior of the cylinder tube 1 is divided by the partitions 11, 12 into three chambers, i.e., a central atmospheric chamber 13 and cylinder chambers 14, 15 one on each side of the chamber 13.

The partitions 11, 12 have respective axial holes 16, 17 formed in coaxial relation to each other. A piston 18 extends through the holes 16, 17 into the cylinder chambers 14, 15. The piston 18 is substantially symmetrical in shape with respect to an axially central portion thereof, and comprises two axially separable members. At the center of the piston 18, the separable members are firmly coupled to each other at confronting portions thereof by a bayonet-type coupling 60, thereby completing the piston 18.

The piston 18 is in the form of a bobbin having disc-shaped lands 19, 20, respectively, at its opposite ends and cylindrical barrels 21, 22 of reduced diameter between the lands 19, 20. The barrels 21, 22 are slidably supported respectively in the holes 16, 17. The lands 19, 20 are axially slidably disposed in the cylinder chambers 14, 15, respectively, with O-rings 19a, 20a mounted in the outer peripheral surfaces of the lands 19, 20, respectively, and slidable against the inner peripheral surfaces of the cylinder chambers 14, 15.

The barrels 21, 22 have respective inner holes 23, 24 communicating axially with each other and extending to postiions near the lands 19, 20. The coupling 60 which joins the barrels 21, 22 to each other has a drain hole 25 through which the inner holes 23, 24 communicate with the atmospheric chamber 13. A pair of confronting plungers 26, 27 are axially slidably housed in the inner holes 23, 24, respectively. The plungers 26, 27 have smaller-diameter projections 26a, 27a, respectively, on confronting ends thereof, and are held against each other through the smaller-diameter projections 26a, 27a. The plungers 26, 27 are normally urged toward each other for coaction by compression coil springs 33, 34 (described later), respectively. Therefore, the plungers 26, 27 functionally serve as a single spool valve body having lands on opposite ends thereof.

The plungers 26, 27 have holes 29, 30, respectively, defined axially therein and extending from inner walls 28 of the lefthand and righthand ends of the inner holes 23, 24 toward the confronting ends of the plungers 26, 27. The compression coil springs 33, 34 are accommodated respectively in the holes 29, 30. The compression coil springs 33, 34 have ends borne by the bottom surfaces of the holes 29, 30. Rod-shaped stoppers 31, 32 project axially into the respective compression coil springs 33, 34 and have outer flanges 35, 36, respectively, on their base ends. The outer flanges 35, 36 are clamped between the other ends of the compression coil springs 33, 34 and the inner walls 28. Therefore, the plungers 26, 27 are resiliently biased into abutment against each other. The plugners 26, 27 have annular grooves 37 defined in their outer peripheral surfaces at spaced intervals for allowing the plungers 26, 27 to slide smoothly in the inner holes 23, 24.

The cylinder tube 1 has a governor pressure inlet port 38 for receiving a governor oil pressure from a governor (not shown), and a throttle pressure inlet port 39 for receiving an oil pressure from a throttle device (not shown). The governor pressure inlet port 38 and the throttle pressure inlet port 39 are defined respectively in the cylindrical walls of the cylinder chambers 14, 15 near the partitions 11, 12, i.e., so as to open into spaces 14b, 15b of the cylinder chambers 14, 15 behind the lands 19, 20. The barrels 21, 22 of the piston 18 have communication ports 40, 41 defined respectively therein adjacent to the lands 19, 20 for introducing working oil pressure supplied from the inlet ports 38, 39 via the chamber spaces 14b, 15b into the inner holes 23, 24 of the plungers 26, 27.

The piston 18 also has axial passages 42, 43 defined therein along the inner holes 23, 24, respectively, and opening at the end faces of the lands 19, 20 toward the covers 2, 7 in the cylinder chambers 14, 15. Between the inner holes 23, 24 and the axial passages 42, 43, there are defined in the piston 18 a working oil supply port 45 for communicating a cylinder space 15a in front of the land 20 with the inner hole 30 via the axial passage 43 when the plungers 26, 27 are moved to the left in FIG. 1, a working oil return port 46 for communicating the drain port 25 with the axial passage 42 through portions of the inner holes 23, 24 around the smaller-diameter projections 26a, 27a when the plungers 26, 27 are moved to the left in FIG. 1, a working oil supply port 44 for communicating a cylinder space 14a in front of the land 19 with the inner hole 29 via the axial passage 42 when the plungers 26, 27 are moved to the right in FIG. 1, and a working oil return port 47 for communicating the drain port 25 with the axial passage 43 through the portions of the inner holes 23, 24 around the smaller-diameter projections 26a, 27a when the plungers 26, 27 are moved to the right in FIG. 1.

The inner peripheral surfaces of the barrels 21, 22 defining the inner holes 23, 24 have circumferential annular grooves 48, 49 contiguous to the supply ports 44, 45 and the return ports 46, 47, respectively. The supply ports 44, 45 and the return ports 46, 47 are held in communication with the inner holes 23, 24 through the annular grooves 48, 49. The barrels 21, 22 also have holes 50, 51 defined therein in communication with the annular grooves 48 in diametrically opposite relation to the supply ports 44, 45. The holes 50, 51 are machining holes required to machine the supply ports 44, 45 and hence subsequently closed off by respective plugs 52. The return ports 46, 47 are defined obliquely to the axis of the barrels 21, 22 because they are machined from the free ends of the barrels 21, 22 through the inner holes 23, 24.

A recess 53 is defined centrally in the front end face of the righthand land 20 of the piston 18. An enlarged base end 55 of a piston rod 54 is disposed in the recess 53 and retained therein by a C-ring 56 against axial dislodgement. The piston rod 54 thus integrally and coaxially attached to the piston 18 projects out through a hole 57 defined centrally through the flanged cover 7, and is coupled to a transmission control device for a CVT or the like through a link mechanism (not shown).

The actuator of the above construction has a built-in pilot valve since the plungers 26, 27 in the piston 18 are movable axially under a differential pressure for providing communication between one of the inlet ports 38, 39 with one of the cylinder chambers 14, 15 and also between the other cylinder chamber with the drain port 25.

Operation of the acutator of the above embodiment will be described below.

A governor pressure Pg which is proportional to the engine rotational speed, for example, is applied to the governor pressure inlet port 38, and a throttle pressure Pth which is proportional of the opening of a throttle valve, for example, is applied to the throttle pressure inlet port 39. When there is developed a differential pressure ΔP between the governor pressure Pg and the throttle pressure Pth, the plungers 26, 27 are forced out of balance to move from a larger-oil-pressure chamber into a smaller-oil-pressure chamber. Since the plungers 26, 27 can smoothly move because the frictional resistance to their movement is greatly reduced by the annular grooves 37, the plungers 26, 27 can be moved quickly even when the differential pressure ΔP is relativley low.

When the governor pressure Pg is higher than the throttle pressure Pth, the plungers 26, 27 are moved to the right (FIG. 1) since the governor pressure Pg and the throttle pressure Pth are applied respectively to the lefthand and righthand ends of the plungers 26, 27 through the communication ports 40, 41. The supply port 44 on the lefthand side of the piston 18 is opened to communicate the governor pressure inlet port 38 with the space 14a of the cylinder chamber 14 in front of the land 19 through the axial passage 42, and the return port 47 on the righthand side of the piston 18 is opened to communicate the space 15a of the cylinder chamber 15 in front of the land 20 with the drain port 25 through the axial passage 43. Consequently, the oil pressure in the lefthand cylinder chamber space 14a is equalized to the governor pressure Pg, and the oil pressure in the righthand cylinder chamber space 15a is vented to atmosphere, with the result that the piston 18 is moved to the right.

Since the oil pressure in the lefthand cylinder chamber space 14a is equalized to the governor pressure Pg, and the oil pressure in the righthand cylinder chamber space 15a is vented to atmosphere in this manner, the piston 18 is operated under a large operating force due to the oil pressure Pg.

When the throttle pressure Pth is higher than the governor pressure Pg, the plungers 26, 27 are moved to the left to move the piston 18 to the right in a manner similar to the above operation.

Figure 2:
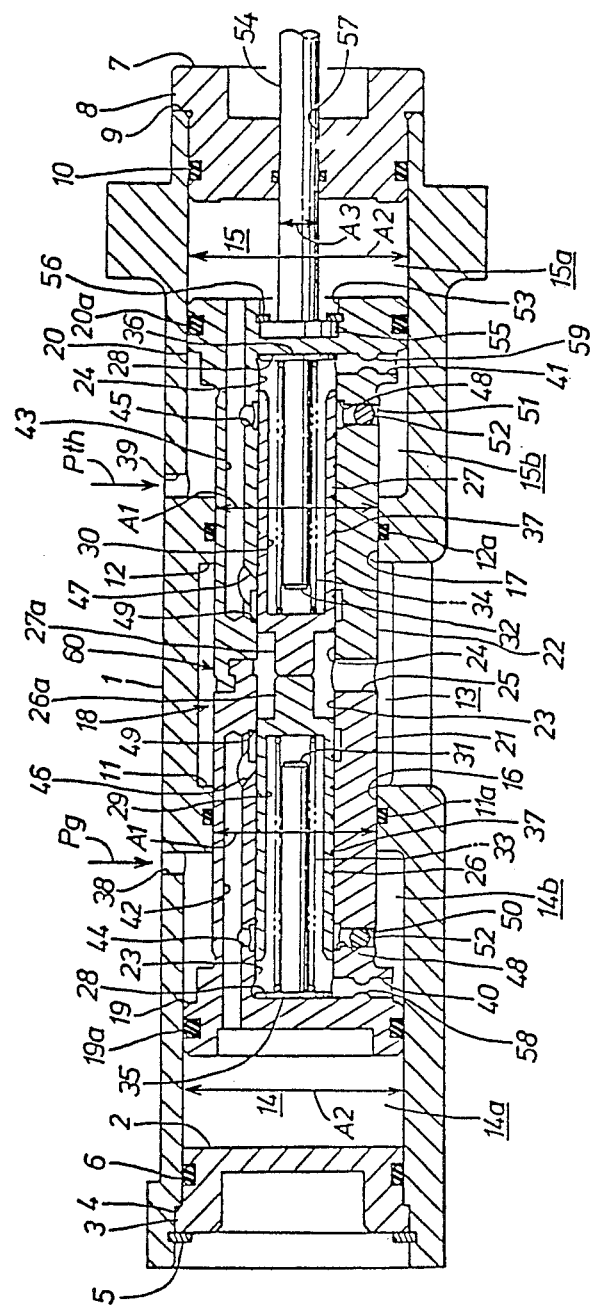
FIG. 2 is a longitudinal cross-sectional view of an actuator with a built-in pilot valve according to a second embodiment of the present invention.

FIG. 2 shows an actuator according to a second embodiment of the present invention. According to the second embodiment, the communication ports 40, 41 have orifices 58, 59, respectively, serving as restrictions.

With the orifices 58, 59 in the communication ports 40, 41, the difference between pressures acting on the opposite ends of the plungers 26, 27 is smaller than the differential pressure between the inlet ports 38, 39. Therefore, the speed of movement of the plungers 26, 27 is lower than it is in the case where the orifices 51, 52 are not provided in the communication ports 40, 41. Accordingly, when the plungers 26, 27 are moved in one direction, the speed of flow of the working oil into the cylinder chambers 14, 15 is also reduced. As a result, the speed of operation of the piston 18 is not excessively high in a range of small differential pressures ΔP, and the actuator can provide appropriate servo operation.

As the plungers 26, 27 are moved, the annular groove 48 is gradully opened to provide a variable orifice effect. Together with the slow movement of the plungers 26, 27, as described above, the progressive opening of the annular groove 48 provides a greater orifice effect.

The orifices 58, 59 are provided in the communication ports 40, 41 in the second embodiment because it is better to provide orifices in ports which introduce working oil in order to provide an orifice effect with respect to the speed of movement of the plungers 26, 27. Although orifices might be provided in the inlet ports 38, 39, the orifices 58, 59 in the communication ports 40, 41 are more advantageous as is apparent from the following description of comparison between orifices provided in the inlet ports 38, 39 and in the communication ports 40, 41:

Assuming here that flow rates of working oil through the inlet ports 38, 39 and the communication ports 40, 41 when the piston 18 is moved to the left by a distance ΔL under the differential pressure ΔP are indicated by V1, V2, V3, V4, respectively, the inside diameter of the holes 16, 17 (FIG. 2) is indicated by A1, the inside diameter of the cylinder chambers 14, 15 by A2, and the outside diameter of the rod 54 by A3, $$V1 = (A2 - (A2 - A1))\Delta L$$
$$= A1\Delta L.$$

Provided A3<<A2, $$V2 = (A2 - A1)\Delta L$$
$$V3 = A2\Delta L$$
$$V4 = 0.$$

It is also assumed that the oil pressures of working oil after it has passed through the orifices provided in the inlet ports 38, 39 are indicated by P1, P2, and the oil pressures of working oil after it has passed through the orifices provided in the communication ports 40, 41 are indicated by P3, P4, and all of the orifices are of the same size.

The oil pressure P1 in the governor pressure inlet port 38 is higher than the oil pressure P3 in the communication port 40 (P1>P3) since V1<V3.

The oil pressure P2 in the throttle pressure inlet port 39 is higher than the oil pressure P4 in the communication port 41 (P2<P4) since V2>V4.

Therefore, P1−P2>P3−P4, and the differential pressure is lower by providing orifices in the communication ports 40, 41 than by providing orifices in the inlet ports 38, 59. The speed of movement of the plungers 26, 27 is lowered, and servo operation of the actuator in a range of small differential pressures is rendered stabler.

FIG. 3 shows an actuator in accordance with a third embodiment of the present invention. According to the third embodiment, the axial lengths of the plungers 26, 27 are determined such that when the plungers 26, 27 are in a neutral position as shown, the plungers 26, 27 uncover the respective supply ports 44, 45 so that the plungers 26, 27 do not close the supply ports 44, 45 simultaneously. The plungers 26, 27 excessively cover the respective return ports 46, 47 beyond them by amounts which are the same as or larger than the amounts by which the plungers 26, 27 uncover the supply ports 44, 45.

When a slight differential pressure is developed, working oil enters from the communication port 40 into the inner hole 23, and a small amount of working oil is delivered into the lefthand cylinder chamber space 14a. Since the plungers 2, 27 underlap the supply ports 44, 45 by predetermined amounts, working oil is also introduced from the communication port 41 into the inner hole 24, and a small amount of working oil is fed into the righthand cylinder chamber space 15a. Therefore, the piston 18 starts moving gradually in one direction only when the differential pressure exceeds a certain level. When the plungers 26, 27 are moved, one of the return ports 46, 47 start to open and communicate with the drain port 25, and the corresponding cylinder chamber space 14a or 15a is vented atmosphere. The piston 18 is now moved in one direction under a large operating force.

The above effect is indicated below by equations.

In the neutral position shown in FIG. 3, the plungers 26, 27 uncover the supply ports 44, 45 by respective amounts x1, x2, and the plungers 26, 27 excessively cover the return ports 46, 47 by respective amounts x3, x4. Here, $x1 \leq x3$ and $x2 \leq x4$. The amount of movement of the plungers 26, 27 from the neutral position is u. The rightward direction in FIG. 3 is assumed to be positive, and Pg, Pth, A1 through A3 are determined in the same manner as with the second embodiment.

In the range of $x1 > u > -x2$, an operating force F1 produced in the lefthand cylinder chamber 14 is given by:

$$F1 = A2Pg + (A2 - A1)Pth$$

and an operating force F2 produced in the righthand cylinder chamber 15 is expressed by:

$$F2 = (A2 - A1)Pg + (A2 - A3)Pth$$

Therefore, an operating force F on the piston 18 is given as follows:

$$F = F1 - F2$$
$$= A1(Pg - Pth) + A3Pth$$

Assuming that $A3 << A2$, $\Delta P = Pg - Pth$, $$F = A1\Delta P \approx A2\Delta P$$

Thus, the operating force F on the piston 18 is proportional to the differential pressure $\Delta P$.

The range of $\Delta P$ can be determined by suitably selecting spring constants of the compression coil springs 33, 34 for achieving an appropriate range of stable servo operation.

In the range of $x3 \leq u \leq x1$, the plungers 26, 27 simultaneously close the righthand supply port 45 and return port 47, the righthand cylinder chamber space 15a is closed off, and $$F = 0.$$

In the range of $-x2 > u \leq -x4$, similarly, $$F = 0.$$

In the range of $u > x3$, since $$F1 = A2Pg + (A2 - A1)Pth, \text{ and}$$

$$F2 = (A2 - A1)Pg,$$

$$F = A2Pg + (A2 - A1)\Delta P$$
$$= A2Pg (A2 - A1 \approx 0)$$

Therefore, the operating force F on the piston 18 is of a large level in proportion to the oil pressure in the cylinder chamber space 14a.

In the range of $-x4 > u$, $$F = -A2Pth.$$

Consequently, if the differential pressure $\Delta P$ is small, the speed of movement of the plungers 26, 27 is low, and an operating force on the piston 18 proportional to the differential pressure $\Delta P$ is obtained until one of the cylinder chambers 14, 15 is vented to atmosphere. If the differential pressure $\Delta P$ is large, the speed of movement of the plungers 26, 27 is high, and hence one of the cylinder chambers 14, 15 is vented to atmosphere immediately, and the higher oil pressure is applied to the other cylinder chamber. Therefore, a large operating force on the piston 18 is produced by the higher oil pressure.

Where the actuator with the built-in pilot valve is employed for controlling a transmission such as a CVT for example, the governor pressure Pg and the throttle pressure Pth are applied as input pressures. In a range in which the difference $\Delta P$ between the governor pressure Pg and the throttle pressure Pth is small, the transmission can be controlled in proportion to the differential pressure $\Delta P$ under stable servo operation. In a range in which the differential pressure $\Delta P$ is somewhat large, the transmission can be controlled by quick servo operation under a large operating force created by the higher input pressure.

With the actuator with the built-in pilot valve according to the present invention, a large operating force can be generated with a relatively small differential pressure, so that quick servo operation can be accomplished. Thus, even when the differential pressure is low due to a mechanical frictional loss caused by an applied external force, the acutator can be operated by a large operating force without malfunctioning. Inasmuch as the pilot valve is incorporated in the piston, the actuator is compact in size, with the consequnce that a hydraulic device combined with the actuator can be reduced in size.

More preferable servo operation can be achieved by providing orifices in the communication ports of the pilot valve or arranging the plungers to uncover the supply ports.

Although certain preferred embodiments have been shown and described, it should be understood that many changes and modifications may be made therein without departing from the scope of the appended claims.

What is claimed is:

1. An actuator with a built-in pilot valve, comprising:

a cylinder tube having first and second cylinder chambers coaxially defined therein;

a piston having first and second piston lands slidably and fluid-tightly disposed respectively in said first and second cylinder chambers, and having a piston rod as an operating end, said piston having an axial inner hole defined therein and having closed opposite ends;

a spool valve body axially movably and fluid-tightly disposed in said inner hole and having first and second spool lands;

first and second axial passages defined in said piston and extending axially inwardly from front surfaces of said piston lands, respectively, said first and second axial passages being held out of communication with each other;

a first inlet port for communicating a portion of said first cylinder chamber behind said first piston land with a first external pressure source;

a second inlet port for communicating a portion of said second cylinder chamber behind said second piston land with a second external pressure source;

a first communication port communicating said portion of said first cylinder chamber behind said first piston land with a portion of said inner hole in front of said first spool land;

a second communication port communicating said portion of said second cylinder chamber behind said second piston land with with a portion of said inner hole in front of said second spool land;

a first return port for communicating said first axial passage with a pressure sink by being opened by said first spool land when said spool valve body is moved in a first direction;

a second supply port for communicating said second axial passage with the portion of said inner hole in front of said second spool land by being opened by said second spool land when said spool valve body is moved in said first direction;

a second return port for communicating said second axial passage with the pressure sink by being opened by said second spool land when said spool valve body is moved in a second direction;

a first supply port for communicating said first axial passage with the portion of said inner hole in front of said first spool land by being opened by said first spool land when said spool valve body is moved in said second direction; and said spool valve being movable dependent on the magnitude relationship between a pressure acting from said first external pressure source in front of said first spool land through said first inlet port and said first communication port and a pressure acting from said second external pressure source in front of said second spool land through said second inlet port and said second communication port.

2. An actuator according to claim 1, wherein at least one of said first and second communication ports has a restriction.

3. An actuator according to claim 1, wherein said first and second spool lands uncover said first and second supply ports, respectively.

* * * * *